United States Patent
Boese

(10) Patent No.: US 11,014,328 B2
(45) Date of Patent: May 25, 2021

(54) METHOD FOR ADJUSTING THE ELASTICITY OF A MATERIAL AND WORKPIECE PRODUCED BY THIS METHOD

(71) Applicant: KARLSRUHER INSTITUT FUER TECHNOLOGIE, Karlsruhe (DE)

(72) Inventor: Till-Falco Boese, Mannheim (DE)

(73) Assignee: KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 273 days.

(21) Appl. No.: 16/065,076

(22) PCT Filed: Dec. 20, 2016

(86) PCT No.: PCT/EP2016/082002
§ 371 (c)(1),
(2) Date: Sep. 24, 2018

(87) PCT Pub. No.: WO2017/108842
PCT Pub. Date: Jun. 29, 2017

(65) Prior Publication Data
US 2019/0001607 A1   Jan. 3, 2019

(30) Foreign Application Priority Data
Dec. 22, 2015   (DE) .......................... 102015122621.9

(51) Int. Cl.
*B32B 1/08* (2006.01)
*B32B 5/04* (2006.01)
(Continued)

(52) U.S. Cl.
CPC .................. *B32B 1/08* (2013.01); *B32B 1/00* (2013.01); *B32B 5/04* (2013.01); *B32B 5/26* (2013.01);
(Continued)

(58) Field of Classification Search
CPC ............... B32B 1/00; B32B 2260/046; B32B 2260/023; B32B 2262/101; B32B 2262/106; B32B 2307/51; B32B 2307/546; B32B 27/08; B32B 5/04; B32B 7/02; B32B 2250/20; B32B 2232/101; B32B 2232/106; B32B 5/26; B32B 1/08; B32B 2262/08; B32B 2262/103; B32B 27/02; B32B 27/20; B32B 7/03; B32B 2605/00; B32B 15/18;
(Continued)

(56) References Cited

U.S. PATENT DOCUMENTS

| 6,099,941 A | 8/2000 | Wimmer |
| 2004/0076809 A1* | 4/2004 | Spears ..................... B32B 5/02 |
| | | 428/292.1 |
| 2013/0049273 A1* | 2/2013 | Shigematsu ............ F16F 1/368 |
| | | 267/158 |

FOREIGN PATENT DOCUMENTS

| EP | 2570694 A1 | 3/2013 |
| GB | 1333558 A | 10/1973 |
| WO | 9622188 A1 | 7/1996 |

OTHER PUBLICATIONS

Byju's the Learning APP Relation between Elastic Constants, accessed online May 17, 2020.*

* cited by examiner

*Primary Examiner* — Camie S Thompson
(74) *Attorney, Agent, or Firm* — Abel Schillinger, LLP

(57) ABSTRACT

The present invention relates to a method for adjusting the elasticity of a work material, to a workpiece produced by this method, and to the use thereof.

19 Claims, 4 Drawing Sheets

(51) Int. Cl.
   *B32B 5/26* (2006.01)
   *B32B 7/02* (2019.01)
   *B32B 27/08* (2006.01)
   *B32B 27/20* (2006.01)
   *B32B 1/00* (2006.01)
   *B32B 7/03* (2019.01)
   *B32B 15/18* (2006.01)

(52) U.S. Cl.
   CPC .................. *B32B 7/02* (2013.01); *B32B 7/03* (2019.01); *B32B 15/18* (2013.01); *B32B 27/08* (2013.01); *B32B 27/20* (2013.01); *B32B 2260/046* (2013.01); *B32B 2262/02* (2013.01); *B32B 2262/08* (2013.01); *B32B 2262/101* (2013.01); *B32B 2262/103* (2013.01); *B32B 2262/106* (2013.01); *B32B 2307/51* (2013.01); *B32B 2307/546* (2013.01); *B32B 2605/00* (2013.01)

(58) Field of Classification Search
   CPC ..... F16F 1/368; B60G 11/02; B60G 2202/01; B60G 2206/7101; B21B 1/00; F41B 5/00
   USPC .............................. 26/158; 428/297.4, 292.1
   See application file for complete search history.

METHOD FOR ADJUSTING THE ELASTICITY OF A MATERIAL AND WORKPIECE PRODUCED BY THIS METHOD

BACKGROUND OF THE INVENTION

1. Field of the Invention

The present invention relates to a method for adjusting the elasticity of a work material, to a workpiece produced by this method, and to the use thereof.

2. Discussion of Background Information

Lightweight construction is a central theme in a wide variety of situations, including vehicle construction and aircraft construction. Structural optimization is an essential constituent in the development of mechanical parts and lightweight parts in order to achieve maximum performance and/or conserve resources. Thus, in chassis technology and in the production of spring elements, for example, there is a need for corrosion-resistant, fatigue-endurable, lightweight chassis springs with a high energy absorption capacity. In the aerospace industry as well as the shipbuilding industry there is a need for structurally optimized components for weight reduction, such as, for example, (structurally) optimized decks and hulls. In the automotive and motor sport industry too, there is a need for optimized chassis components (such as, for example, optimized leaf and coil springs made of CFRP/GFRP composite) and bodies.

Nowadays, various methods of structural optimization are used in virtual product development. In general, a distinction is made between the methods of cross-section optimization (sizing), shape optimization (shape optimal design) and topology optimization.

By means of topology optimization, that is to say the optimization of, for example, the shape of the components, wall thicknesses or fiber orientations, for example, can be optimized. In cross-section optimization, only cross-sectional values (thickness, height, cross-sectional area, moment of inertia, etc.) are used as optimization variables. Cross-section optimization is used, for example, when both the shape and the structural design are already defined. Cross-section optimization can thus be used in the optimal design of composite materials (e.g. glass fiber or carbon fiber laminates) in order to determine the optimal ply structure in order to save material and thus weight.

According to the prior art, components are designed and conceived according to Bernoulli's kinematic hypothesis. Using the example of a beam, this hypothesis states that, in the case of a bending load, a linear (tensile/compressive) stress distribution is established in the beam. In the case of a torsion rod, a linear (shear) stress distribution accordingly develops over the entire cross-section. The textbook "Festigkeitslehre" [strength theory] by Herbert Balke makes the restriction that the assumptions are "valid regardless of special properties of isotropic homogeneous materials" (Herbert Balke. Einführung in die Technische Mechanik: Festigkeitslehre, Volume 3, page 82). The properties of an isotropic material are the same in all directions. In contrast to an isotropic material, in an anisotropic material the properties change in dependence on the direction and position. The elasticity of work materials is generally anisotropic and can be described by the laws of elasticity. Carbon-fiber-reinforced plastics (CFRP) and glass-fiber-reinforced plastics (GFRP) and drawn plastics have a direction-dependent law of elasticity.

In the textbook TM2 by Gross, on the other hand, this stress distribution is described as universally valid—without reference to isotropy (Dietmar Gross. Technische Mechanik 2—Elastostatik, Volume 12, page 89ff). This description leads to incorrect conclusions in later design with anisotropic materials. Thus, it is a known structural optimization technique in lightweight construction to omit component volumes that are free of stress. In the case of the isotropic beam, this results in the conventional double-T beam geometry, while in the case of twisted rods, the tube is the result.

It is an aim of strength theory (elastostatics) to draw conclusions about loads on mechanical parts or structures. For this purpose, the bending or the deformation and stress state, for example, of slim and/or thin components (beams, arcs, shells or sheets) is calculated by applying bending theories. The layer of a component whose length does not change under load is referred to as the "neutral fiber" (or "neutral axis"). At this point, the load does not cause any tensile or compressive stresses or shear stresses. The layers (plies) that are located furthest away from the neutral fiber in the perpendicular direction are at the greatest risk of crack formation. These cracks form as a result of an inadequate yield strength Re or elastic elongation limit E of the material at that point.

The maximum stress always occurs at the surface of the component or workpiece. This makes the component or workpiece particularly sensitive to external damage. A fundamental problem in the case of the structural optimization used in the prior art is that the structure exposed to low stress close to the neutral fiber has hitherto either been omitted or filled with a foam or honeycomb structure.

A further problem is that structural optimization has hitherto been carried out on the basis of the stress distribution at constant modulus. The modulus of elasticity (elastic modulus, symbol E) is a material property from work material technology which describes the relationship between stress and strain in the deformation of a solid body with linear elastic behavior. The more resistance a material presents to elastic deformation, the greater the contribution of the elastic modulus. By analogy, the shear modulus (symbol G) is defined as the linear elastic deformation of a component as a result of a shear force.

The object of the invention is therefore the structural optimization, or cross-section optimization, of a component for maximum reversible energy absorption capacity.

SUMMARY OF THE INVENTION

The object is achieved by a method for adjusting the elasticity of a work material comprising two or more materials which are arranged in layers, wherein the layers have different moduli and are so arranged that, starting from a neutral fiber, they have decreasing moduli.

Work materials are substances (materials) which are processed further in production processes and are incorporated into end products. The work materials (materials) are selected from the group containing or consisting of raw materials, auxiliary materials or pre-products and semi-finished products.

Within the meaning of the invention, work materials are understood as being combinations of different material types and/or material grades. Examples of different materials are to be found in Tables 1, 2 and 3.

It is important that the materials are present in layers, that is to say individual plies, within the work material and that the moduli of the layers, that is to say plies, are different.

According to the invention, the individual layers comprise different materials. In an alternative, combinations of two or more materials may also be present in the individual plies.

If the same type of fiber, that is to say fibers of the same type and grade, is used in different orientations, these are two different layers according to the invention. Preferably, a different orientation of the same type of fiber in two different layers at an angle of between 0° and +−45° is chosen.

Two layers differ from one another in at least one physical and/or chemical feature, in particular in their E and/or G modulus value.

In one embodiment of the present invention, homogeneous fibers are used for each layer, that is to say only one type of fiber is used for each layer. Types or kinds of fibers are given, for example, in Table 3. In this embodiment, mixtures of fibers are not used in the same layer. That is to say, all the fibers of a layer have the same properties, in particular the same chemical and/or physical properties, particularly preferably the same E and/or G modulus values.

In one embodiment, the materials are in the form of fibers, optionally present in a matrix. The work material according to the invention therefore comprises a combination of different fiber types, fiber grades and/or fiber orientations.

In one embodiment, natural fibers are used, that is to say fibers from sustainable or renewable raw materials. These are raw materials which are of plant or animal origin.

According to the invention, a layer can consist of a matrix in which the materials to be used, preferably fibers, are incorporated. Resins known to the person skilled in the art can be used as the matrix.

In one embodiment, the same matrix is used for all the layers of the work material.

On the one hand, the matrix consequently plays no role in respect of the change in the modulus. On the other hand, further substances, such as, for example, adhesives, which would not fit into the sequence in terms of their modulus, are avoided.

In one embodiment, however, different matrices can also be used or the workpiece is provided with a surface finishing.

The modulus of the individual plies is preferably increased in the direction towards the layer whose length does not change under loading. Such a layer is the so-called neutral fiber. As a result, the ply with the highest modulus is adjacent to the neutral fiber.

The present invention shows that, by using the modulus as the variable in the structural optimization process and increasing the modulus in the direction towards the neutral fiber, or varying the modulus over the stress cross-section, the stress distribution can purposively be influenced and homogenized.

Workpiece within the meaning of the invention denotes any components, such as, for example, bearing structures, mechanical parts, springs (coil springs, spiral springs, leaf springs, etc.), beams, chassis components, et cetera.

The present invention provides a completely new understanding of stress distributions when using anisotropic materials as compared with isotropic materials, since with the novel method this region can also be utilized for a large part of the energy absorption, while in the prior art that structure exposed to low stresses close to the neutral fiber has hitherto either been omitted or filled with a foam or honeycomb structure.

A further advantage of the invention is that, in particular when using anisotropic work materials such as, for example, fiber-reinforced plastics, the modulus can be adjusted in a very large range. Thus it is possible to change the stress distribution drastically as compared with isotropic materials. The maximum stress thus no longer necessarily occurs at the surface.

Furthermore, uniform and/or homogeneous stress of the entire stress cross-section is advantageously achieved in this manner. A further advantage is that a stress distribution according to the maximum yield strengths, or elastic elongation limits, of the material in question can be achieved.

The method is generally suitable for optimizing all structures subjected to tensile/compressive and bending stress. In addition, in the case of torsional stress, the shear modulus can be varied analogously and a corresponding structure of the work material can be achieved.

The presence, or occurrence, of such a neutral fiber, that is to say a deformation-free layer (ply), is essential for the present invention.

This finding leads to a stress distribution in the material cross-section which can be adapted to the material used in each case. Accordingly, the combination of materials with different moduli is critical.

Typical moduli are shown below in Table 1:

TABLE 1

| Modulus values for different materials | | |
|---|---|---|
| Material | E modulus [GPa] | G modulus [GPa] |
| Construction steel | 200 . . . 216 | 77 . . . 85 |
| V2A steel | 189 . . . 210 | 74 . . . 84 |
| Cast iron | 90 . . . 145 | 31 . . . 71 |
| Brass | 78 . . . 123 | 35 . . . 42 |
| Copper | 100 . . . 130 | 45 . . . 52 |
| Titanium | 110 . . . 120 | 36 . . . 51 |
| Aluminum | 68 . . . 89 | 25 . . . 34 |
| Magnesium | 42 . . . 47 | 15 . . . 19 |
| Lead | 13 . . . 17 | 4 . . . 6 |
| Gold | 77 . . . 81 | 26 . . . 30 |
| Nickel | 150 . . . 245 | 72 . . . 100 |
| Tungsten | 310 . . . 406 | 120 . . . 148 |
| Glass | 40 . . . 90 | 25 . . . 49 |
| Concrete | 20 . . . 40 | 6 . . . 11 |
| Technical ceramics | 140 . . . 700 | 60 . . . 283 |
| Wood | 6 . . . 25 | 0.3 . . . 2 |
| Polypropylene | 0.8 . . . 1.8 | 0.3 . . . 0.5 |
| Natural rubber | up to 0.05 | up to 0.0008 |
| Graphene | about 1000 | N/A |
| Diamond | 800 . . . 1200 | 440 . . . 470 |
| Marble | 50 . . . 72 | 22 . . . 28 |
| Hard rubber | 5 | 0.0003 |
| Carbon fiber UHM | 690 . . . 830 | 310 . . . 370 |
| Carbon fiber VHM | 530 . . . 580 | 230 . . . 240 |
| Carbon fiber HM | 370 . . . 390 | 165 . . . 175 |
| Carbon fiber HS | 225 . . . 245 | 100 . . . 110 |
| Tungsten carbide | 388 . . . 406 | 165 . . . 175 |
| Titanium boride | 500 . . . 545 | 229 . . . 245 |
| Silicon carbide | 440 . . . 480 | 190 . . . 210 |
| Aramid (fiber) | 170 . . . 190 | 1 . . . 2 |
| Asbestos/kevlar | 160 . . . 195 | 44 . . . 66 |
| Ramie (Chinese grass) | 61 . . . 128 | 14 . . . 16 |
| Basalt fiber | 71 . . . 110 | 31 . . . 41 |
| S-Glass fiber | 86 . . . 93 | 35 . . . 39 |
| E-Glass fiber | 72 . . . 85 | 30 . . . 36 |
| T-Glass fiber | 68 . . . 76 | 27 . . . 32 |
| C-Glass fiber | 66 . . . 70 | 27 . . . 30 |

Modulus of Laminates:

TABLE 2

| Material 0° (isotropic) | E modulus [GPa] | G modulus [GPa] |
|---|---|---|
| Cyanate ester + carbon HM | 299 ... 376 (101 ... 115) | 4 ... 5 (33 ... 42) |
| PEEK + carbon IM | 146 ... 149 (56 ... 57) | 5 ... 6 (21 ... 22) |
| EPOXY + carbon HS | 129 ... 154 (49 ... 60) | 3 ... 7 (19 ... 23) |
| BMI + carbon HS | 110 ... 130 (55 ... 65) | 5 ... 6 (16 ... 20) |
| Epoxy + S-glass | 47 ... 48 (19 ... 21) | 4 ... 5 (9 ... 10) |

According to the invention, possible combinations are, for example, carbon fibers with glass fibers or aramid fibers with basalt fibers.

In principle, there should be a difference of 4 or more percent in the comparison of the elongation limit. The optimal range of the E-moduli of the fibers is here between 60 GPa and 830 GPa, or between 80 GPa and 600 GPa.

In an alternative, the stress jumps between two adjacent layers should be only moderate, that is to say layers whose modulus values are very different should not be arranged next to one another. Modulus values of adjacent layers which differ by from 0.1% to 100% would be conceivable. The modulus changes by a factor of from 1.01 to 13 over the work material as a whole. In general, it is to be noted that all the moduli relate purely to the fibers. However, this is of no value without the resin; the modulus is therefore over 40% lower in the laminate composite and additionally dependent on the resin used and the fiber volume fraction or production method. The highest modulus used determines the price. The price per kg of material doubles for each modulus stage (HM→VHM→UHM). It is therefore realistic to provide a small UHM thickness close to the neutral fiber with a rapid change to less expensive grades. In order merely to achieve the values of a steel component, carbon fibers of HS or HM grade and ranges between 80 GPa (glass fiber) and 390 GPa are sufficient. In LAMINATES, the maximum values are accordingly between 40 GPa and 340 GPa.

The optimal range of the G moduli of the fibers is between 27 GPa and 370 GPa, or between 35 GPa and 175 GPa.

It is essential to the invention to use a work material having a high modulus which nevertheless does not have adequate extensibility. The combination with a fiber having a corresponding high elongation limit but a low modulus leads to a surprising combination of the properties in question.

In general, long and continuous fibers are suitable according to the invention for the optimization according to the invention. Fibers which can advantageously be used according to the invention are to be found in Table 3 below.

TABLE 3

| | |
|---|---|
| Natural fibers: | hair, wool, silk, cotton, flax, sisal, hemp, jute, ramie, banana fibers |
| Organic fibers: | PE, PP, PA, PES, PAN, aramid (kevlar), carbon |
| Inorganic fibers: | glass, basalt, quartz, SiC, Al$_2$O, boron, asbestos |
| Metal fibers: | steel, aluminum, copper, nickel, beryllium, tungsten |

In general, there is a negative correlation in work materials between the modulus and the elongation limit. Carbon, for example, as a spring work material has a high elastic modulus and a high yield strength—but not high extensibility. Glass fiber, on the other hand, has a high elongation limit but a very low elastic modulus. The challenge has always been to combine the two properties. The modulus is now purposively increased in the direction towards the lowest elongations (neutral fiber).

In one embodiment, a combination of materials from 2, 3, 4 or more selected from Tables 1, 2 and 3 is used.

The theoretical results can be illustrated by means of simulations of an isotropic spring and a spring in which the elastic modulus increases in the direction towards the neutral fiber. The twisted coil spring is equivalent to a coiled beam and behaves as predicted in the case of isotropic material.

In the middle of the material there forms a neutral fiber, which does not contribute to energy absorption.

The stress distribution is linear and the material utilization in the case of this stress (type utilization factor) is 50 percent or 0.5. According to the methods and processes known in the prior art, the fiber with the highest yield strength (that is to say carbon) would be used at the points of highest stress. The middle of the cross-section would be foamed with structurally weak material or filled with a honeycomb structure, as in known sandwich constructions.

Within the meaning of the invention, however, the material with the highest elastic modulus is positioned in the neutral fiber, that is to say in the layer whose length does not change in the bending process.

The material with the highest elasticity is positioned in the ply that is furthest away from that layer whose length does not change in the bending process, that is to say that is furthest away from the neutral fiber. This is preferably the edge layer of a work material.

In contrast to existing solutions, the high tensile fiber, for example (carbon), is positioned not in the edge layers but in the middle of the cross-section, since the greatest stresses prevail or are generated there. The fiber with the highest elasticity (glass fiber) is positioned in the edge layers.

The present invention therefore provides a method for producing work materials and workpieces, and those work materials and workpieces, which are not exposed to radial stress and/or loading by kinetic energy. In one embodiment, no centrifugal forces occur at the work materials and workpieces. In a further embodiment, the work materials and workpieces are subjected only to the effects of the deformation energy.

As a result of the structure according to the invention, the material utilization is optimized in respect of the energy effect, the so-called type utilization factor is increased.

Tests show an increase in the energy absorption capacity of the anisotropic material of 35% compared with isotropic materials.

At the same time, it was possible to reduce the weight of the spring element by 65%.

BRIEF DESCRIPTION OF THE DRAWINGS

In the accompanying drawings.

DETAILED DESCRIPTION OF EMBODIMENTS OF THE INVENTION

Figure 1:
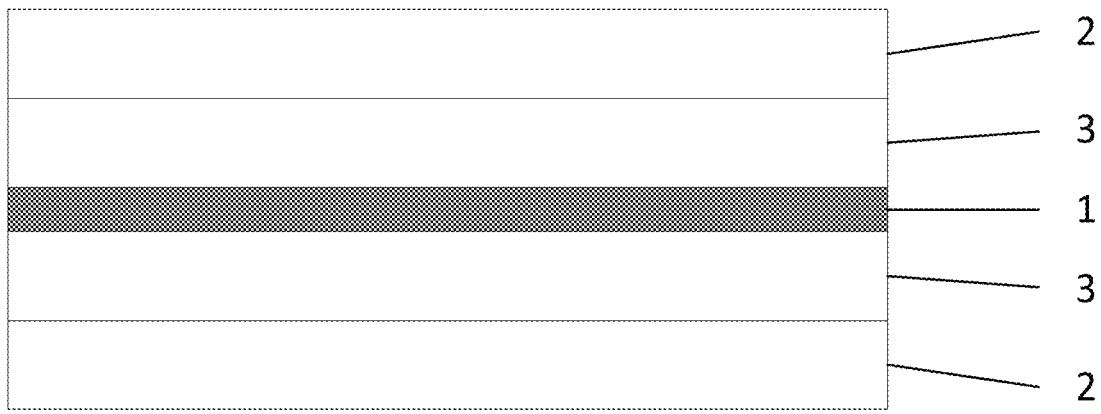
FIG. 1 shows the principle of a structure of a work material according to the invention.

The invention is described in greater detail below with reference to the figures. FIG. 1 shows the principle of a structure of the work material using the example of a beam in cross-section. The neutral fiber 1 develops in the middle. Adjacent to the neutral fiber is the ply 3 that has the highest E modulus in comparison with the other plies. The following ply 2 has the highest elasticity in relation to the other plies. Further layers may follow, whereby each further layer has a smaller modulus value than the preceding layer, starting from the neutral fiber.

Figure 2:
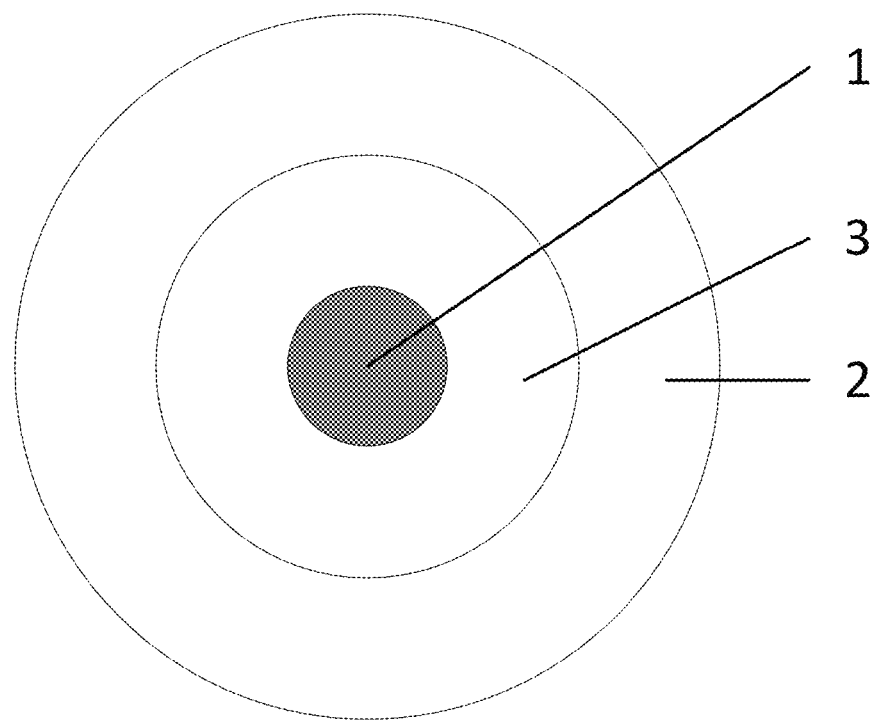
FIG. 2 shows a twisted rod in cross-section as an example of a ply structure according to the invention.

An example of an optimized ply structure of the shear modulus of a twisted rod is shown analogously in section in the following FIG. 2.

Figure 3:
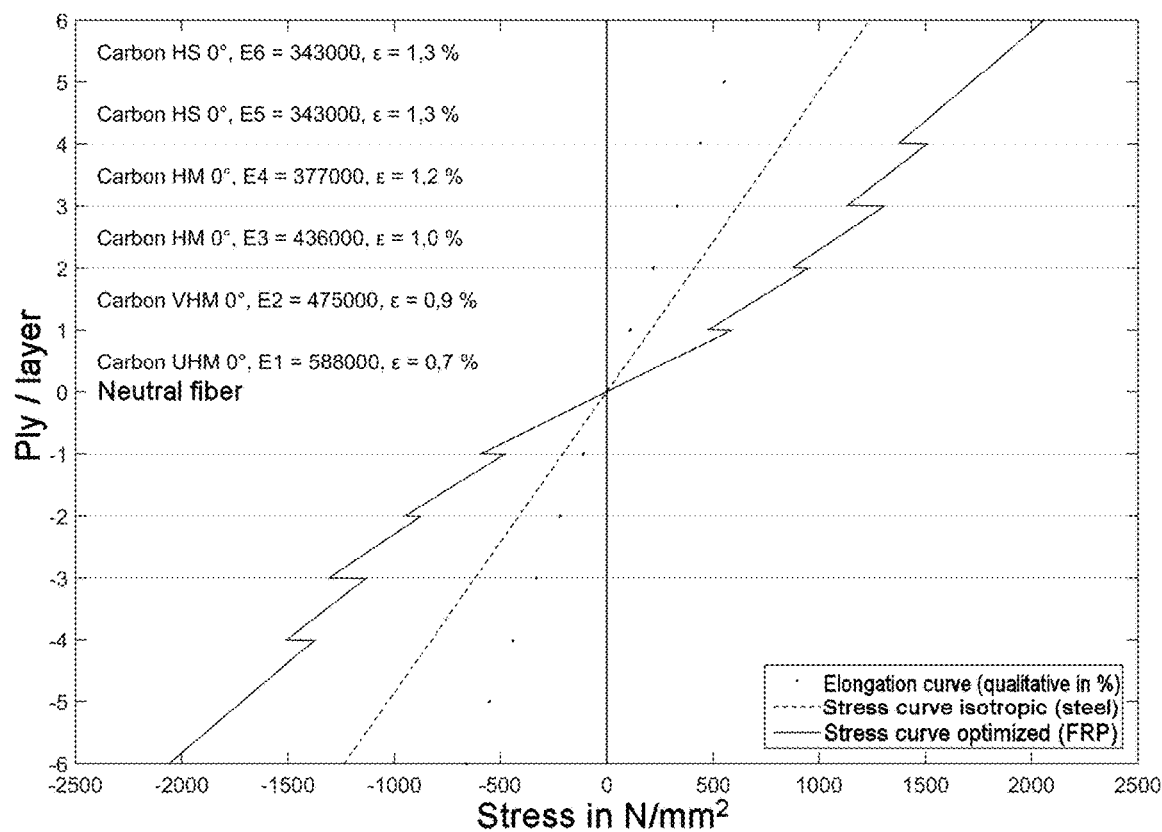
FIG. 3-5 show the stress curves, the y-symmetrical E moduli, the maximum elongation limits and deformation of work materials according to the invention.
Figure 4:
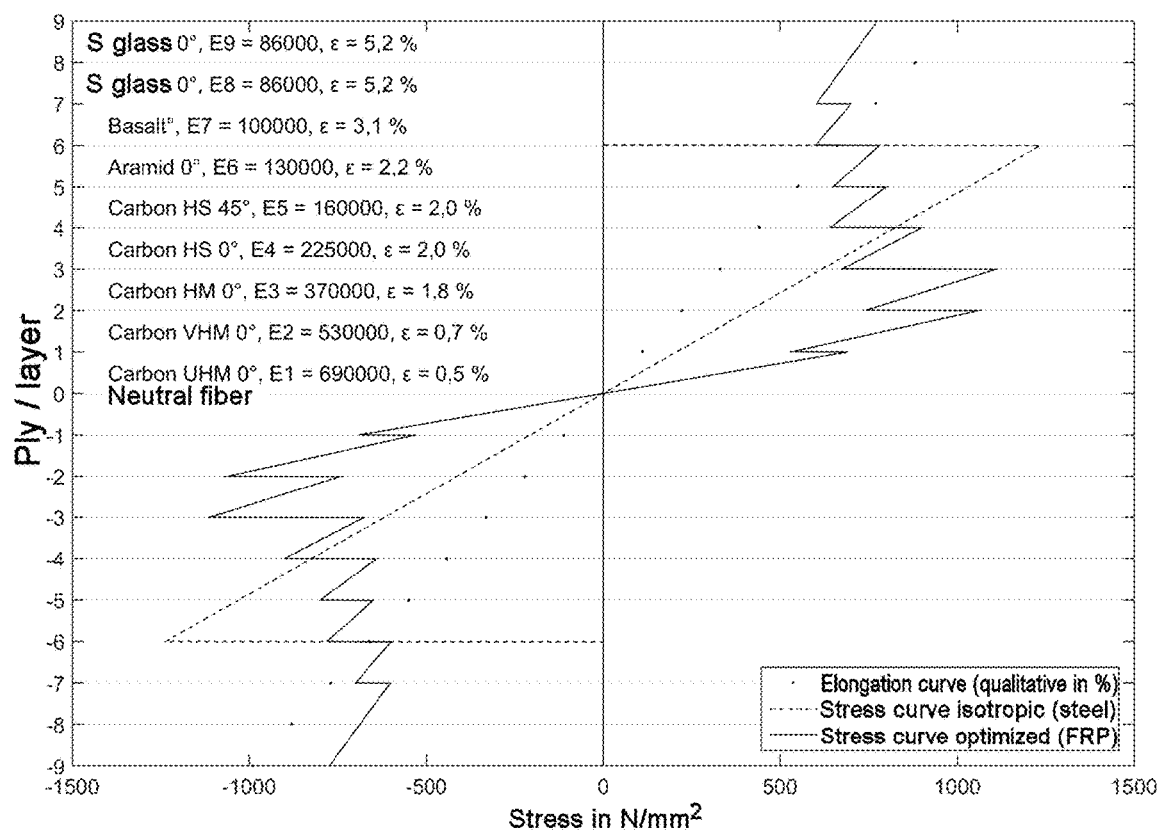
Figure 5:
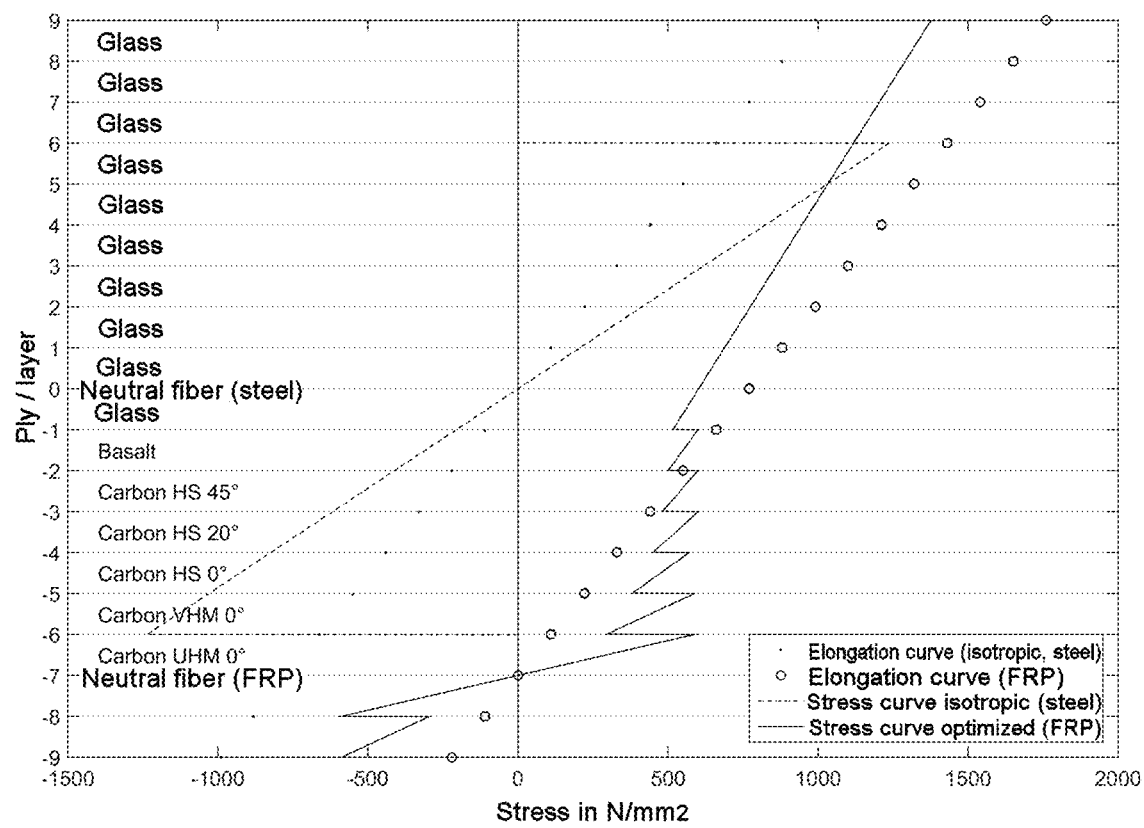

In FIG. 3-5, the stress curve of further, optimized work materials is shown. In addition, the y-symmetrical E moduli and the maximum elongation limits ε as well as the dotted line of the deformation are given. The areas between the respective stress curve and the ordinates are a measure of the energy absorption of the material, or the total area is a measure of the energy absorption of the work material. In the optimized fiber composite (FRP, fiber-reinforced plastic) in FIG. 3, it is about 70% greater than in the case of steel (E modulus 206000).

The resulting ply structure consists solely of high-grade carbon fibers whose E modulus is greater than that of steel. This structure according to FIG. 3 is stiff and very expensive.

The aim is also to utilize the high elongation limit of the glass fibers of >4% in order to adjust only the stiffness of the work material with the carbon fiber (see in this connection FIG. 4). The areas and energy absorptions are almost equal.

The elongation limit of glass fibers of 4% is greater by a factor of 5 than that of steel, but the E modulus is lower by a factor of 3. This gives the additional possibility of increasing the load cross-section compared with steel. The energy absorption of the steel is limited to the triangles shown by broken lines (see FIG. 4). It is thus possible, despite the lower E modulus of glass fiber, to store a large amount of energy therein and to increase the area again.

The neutral fiber does not necessarily have to be in the middle of the work material. An asymmetrical structure results.

The ply optimization occurs according to the invention—but predominantly in one direction. The aim is to increase the absorbed stress of the glass fiber with the same cross-section (FIG. 5).

In one embodiment, the work material according to the invention can be produced as follows:

Two-dimensional geometries are produced, for example, by arranging different fiber mats and woven fabrics/non-crimped fabrics in layers, which are subsequently impregnated and cured under the influence of heat in the tool, in vacuo or in an autoclave. Alternatively, so-called prepregs can be used. Impregnation by the infusion or RTM method is not necessary in this case.

Profile-shaped geometries are produced by the pultrusion or pulwinding method. The starting material is individual fiber rovings, slivers and nonwovens. These are impregnated by a resin bath or directly in the shaping tool, cured in a matrix/cavity under the influence of heat and removed continuously by a caterpillar or gripper mechanism.

The invention also provides a workpiece containing or consisting of the work material according to the invention and/or produced by the method according to the invention.

The field of application of the patent therefore relates explicitly also to workpieces, such as, for example, spring elements of industrial, commercial and garage doors, spring elements and/or bearing surfaces for motor vehicles and aircraft, as well as sports equipment. That is to say, the work material can be used for various items of sports equipment, for example poles for pole vaulting, bows, skis and boards, sailing and surf masts, etc. In principle, the work material is suitable for all equipment in which a high elasticity together with breaking resistance is required. Accordingly, the work materials according to the invention are used as stabilizers, (drive) shafts and/or bearing structures.

"Visible plies" (e.g. carbon fabric) are often used at the edge layers, so that an attractive carbon look is obtained or the work material is more resistant towards environmental influences. Such plies make little contribution to the energy absorption.

What is claimed is:

1. A method for adjusting the elasticity of a work material, wherein the work material comprises two or more materials which are arranged in layers and wherein the layers have different moduli and are arranged so that—starting from a neutral fiber—the layers have decreasing moduli, and wherein the moduli are used as variable in a structural optimization process and are increased in a direction toward a neutral fiber or are varied over a stress cross-section to thereby influence and homogenize a stress distribution.

2. The method of claim 1, wherein different materials are used as the two or more materials.

3. The method of claim 1, wherein the different moduli comprise different E moduli and/or different G moduli.

4. The method of claim 1, wherein the different moduli comprise different E moduli.

5. The method of claim 1, wherein the different moduli comprise different G moduli.

6. The method of claim 1, wherein the two or more materials comprise materials selected from one or more of natural fibers, organic fibers, inorganic fibers, and metal fibers.

7. A work material, wherein the work material comprises two or more materials which are arranged in layers having different moduli and being arranged so that—starting from a neutral fiber—the layers have decreasing moduli, and wherein the work material has been produced by the method of claim 1.

8. A work material, wherein the work material comprises two or more materials which are arranged in layers having different moduli and being arranged so that—starting from a neutral fiber—the layers have decreasing moduli, the neutral fiber not being arranged in a middle of the work material.

9. The work material of claim 8, wherein the different moduli comprise different E moduli and/or different G moduli.

10. The work material of claim 8, wherein the different moduli comprise different E moduli.

11. The work material of claim 8, wherein the different moduli comprise different G moduli.

12. The work material of claim 8, wherein the two or more materials comprise materials selected from one or more of natural fibers, organic fibers, inorganic fibers, and metal fibers.

13. The work material of claim 8, wherein a carbon fiber is arranged in the middle of the work material.

14. The work material of claim 8, wherein fibers having the highest elasticity of an edge layer comprise glass fibers.

15. The work material of claim 8, wherein the workpiece comprises layers of carbon-reinforced plastic and glass-fiber-reinforced plastic.

16. A method of producing mechanical parts and light-weight parts, wherein the method comprises using the work material of claim 8.

17. The method of claim 16, wherein one or more of spring elements and/or bearing surfaces for motor vehicles and aircraft, sports equipment, balance springs for industrial, commercial and garage doors, roller shutters, spring elements and structural elements in motor vehicles and aircraft, pressure vessels and stabilizers, (drive) shafts and/or bearing structures are produced.

18. A workpiece which comprises the work material of claim 8.

19. The workpiece of claim 18, wherein the workpiece is suitable for use as a mechanical part and/or a lightweight part.

* * * * *